United States Patent [19]

Asada et al.

[11] Patent Number: 4,892,418
[45] Date of Patent: Jan. 9, 1990

[54] HYDRODYNAMIC BEARING DEVICE

[75] Inventors: Takafumi Asada, Osaka; Jiro Kataoka, Hyogo; Kouji Nakagawa, Osaka, all of Japan

[73] Assignee: Matsushita Electrical Industrial Co., Ltd., Osaka, Japan

[21] Appl. No.: 264,883

[22] Filed: Oct. 31, 1988

[30] Foreign Application Priority Data

Nov. 2, 1987 [JP] Japan .................................. 62-277613

[51] Int. Cl.$^4$ ............................................. F16C 33/72
[52] U.S. Cl. .................................... 384/124; 384/123; 384/112; 384/135
[58] Field of Search ............... 384/124, 123, 135, 112, 384/121, 111, 112, 607, 465

[56] References Cited

U.S. PATENT DOCUMENTS

| | | | |
|---|---|---|---|
| 3,188,153 | 6/1965 | Turk | 384/135 |
| 3,870,382 | 3/1975 | Reinhoudt | 384/123 |
| 3,887,250 | 6/1975 | Fleissner | 384/135 |
| 4,392,752 | 7/1983 | Shimizu et al. | 384/135 |

Primary Examiner—Lenard A. Footland
Attorney, Agent, or Firm—Wenderoth, Lind & Ponack

[57] ABSTRACT

A hydrodynamic bearing device which includes a shaft, a ring-shaped member and a thrust bearing member, with a lubricating material being held in a space defined in the thrust bearing member and the inner peripheral face of the ring-shaped member. The ring-shaped member is formed, in its inner peripheral face, with a taper for feeding the lubricating material into the thrust bearing member based on centrifugal force, by which the lubricating material is prevented from flowing out.

9 Claims, 4 Drawing Sheets

HYDRODYNAMIC BEARING DEVICE

BACKGROUND OF THE INVENTION

The present invention generally relates to a bearing unit, and more particularly, to a hydrodynamic bearing device in a thrust direction using a lubricating material, and to be employed for a main shaft portion of an apparatus rotating at high speeds such as a hard disc apparatus, polygon scanner apparatus or the like.

In recent years, there has been a trend to employ hydrodynamic bearings having a high rotational accuracy instead of a ball bearing, for a rotatory main shaft portion of a video head rotating assembly, hard disc apparatus, polygon scanner or the like, among which hydrodynamic bearings, particularly those using lubricating fluids such as oil, grease, etc., are adopted owing to the advantages that they have less troubles such as seizure and the like than in an aerodynamic bearing, and that they are high in the bearing stiffness in a wide range of revolutions from low speed to high speed.

Referring to FIGS. 6 to 8, one example of conventional hydrodynamic bearing devices in a thrust direction as employed for a hard disc apparatus will be described hereinafter.

In FIG. 6, the known hydrodynamic bearing device generally includes a base member 1, a shaft 2 fixed at its one end to the base member 1 by shrinkage fit or the like, a hub 3 having a bearing bore 3A for receiving the shaft 2 to constitute a radial bearing, and a thrust bearing member 4 mounted on the hub 3.

The shaft 2 is formed with herringbone grooves 2A and 2B, a flat upper end face 2C finished to be at right angles with respect to the shaft 2 and having a recess hole 2E for storing mixed foreign matters, and an annular groove 2D formed adjacent to the end portion of the shaft 2 as shown. The hub 3 has a space 3B formed at the upper portion of the bore 3A, and ventilation holes 3C and 3D.

As shown in FIG. 7, the thrust bearing member 4 is formed with spiral grooves 4A at its central portion, and a plurality of notches 4B at its peripheral portion for fixing by screws 13 or the like. In FIG. 6, a ring-shaped member 5 having helical grooves 5A in its inner periphery is incorporated within the space 3B together with a seal ring 6 and a C ring 9. Moreover, in the vicinity of the spiral grooves 4A (FIG. 7) of the thrust bearing member 4 and the helical grooves 5A of the ring-shaped member 5, a thrust lubricating material 7 composed of grease in a low viscosity or the like is contained. A radial lubricating material 8, for example of oil or the like is applied to the herringbone grooves 2A and 2B for the shaft 2. In FIG. 6, there are further shown a motor rotor 10, a motor stator 11, a grounding brush 14, and a disc 12 capable of magnetically or optically recording and reproducing signals.

Still referring to FIGS. 6 to 8, functions of the conventional hydrodynamic bearing device having the constructions as described so far will be explained hereinafter.

In the first place, when the motor stator 11 is energized, the motor rotor 10 starts rotation together with the hub 3, disc 12, thrust bearing member 4, ring-shaped member 5, seal ring 6 and C ring 9 for rotation without contact by the pumping action of the herringbone grooves 2A and 2B. Meanwhile, by the pumping action of the spiral groove 4A, the thrust bearing member 4 is brought into a floating or raised state for rotation without contact, and thus, the disc 12 effects the recording and reproduction of the signal by a head or the like (not shown).

In the above arrangement, the C ring 9 engages the annular groove 2D of the shaft 2 for retaining the rotating member or hub 3 in position, while the helical grooves 5A of the ring-shaped member 5 prevent flowing out of the lubricating material, by directing under pressure, the thrust lubricating material 7 poured in the vicinity of the spiral grooves 4A and helical grooves 5A, towards the side of the spiral grooves 4A by the pumping action of said helical grooves 5A. The seal ring 6 also functions to prevent the thrust lubricating material 7 from flowing out. The grounding brush 14 referred to earlier serves to prevent electrostatic destruction of the bearing oil film by causing the static electricity produced on the rotary member to flow towards the stationary member or base member 1.

However, the known arrangement as described so far has a serious disadvantage as follows.

As shown in FIG. 8, when the thrust bearing member 4 and ring-shaped member 5 rotate at high speeds (e.g. above 1,800 rpm), the helical grooves 5A tend to strongly agitate the thrust lubricating material 7 for scattering and flowing out as shown at 7A, 7B and 7C, thus giving rise to shortage of the lubricating material for the thrust bearing to reduce the amount of floating or rising of the rotary member or resulting in mixing of the scattered thrust lubricating material into the radial lubricating material, thereby deteriorating the performance as a radial lubricating material.

SUMMARY OF THE INVENTION

Accordingly, an essential object of the present invention is to provide a hydrodynamic bearing device which is capable of preventing the lubricating material from flowing out by feeding the lubricating material towards the side of a thrust bearing member.

Another object of the present invention is to provide a hydrodynamic bearing device which is simple in construction and stable in functioning at high reliability.

In accomplishing these and other objects, according to the present invention, in a hydrodynamic bearing device which includes a shaft, a ring-shaped member and a thrust bearing member, with a lubricating material being held in a space defined by the thrust bearing member and the inner peripheral face of the ring-shaped member, the ring-shaped member is formed, in its inner peripheral face, with a taper for feeding the lubricating material into the thrust bearing member based on centrifugal force, by which the lubricating material is prevented from flowing out.

More specifically, according to one preferred embodiment of the present invention, there is provided a hydrodynamic bearing device which includes a shaft, a ring-shaped member having an inner peripheral face confronting an outer peripheral face of said shaft in the vicinity of its forward end, and a thrust bearing member disposed in a position confronting a forward end face of said shaft, with a lubricating material being held in a gap defined by an end face of said thrust bearing member, the inner peripheral face of said ring-shaped member and the outer face in the vicinity of the forward end of said shaft, either one or both of the inner peripheral face of said ring-shaped member and the outer peripheral face in the vicinity of the forward end of said shaft being formed with a conical face having a taper to increase its diameter in a direction as it approaches said thrust bearing member.

In the arrangement according to the present invention as described above, by a centrifugal force effect through the taper portion provided on the ring-shaped member, the lubricating material at the thrust bearing portion is stably held even at high speed rotation, and thus, an improved hydrodynamic bearing device without shortage of lubricating material may be presented.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
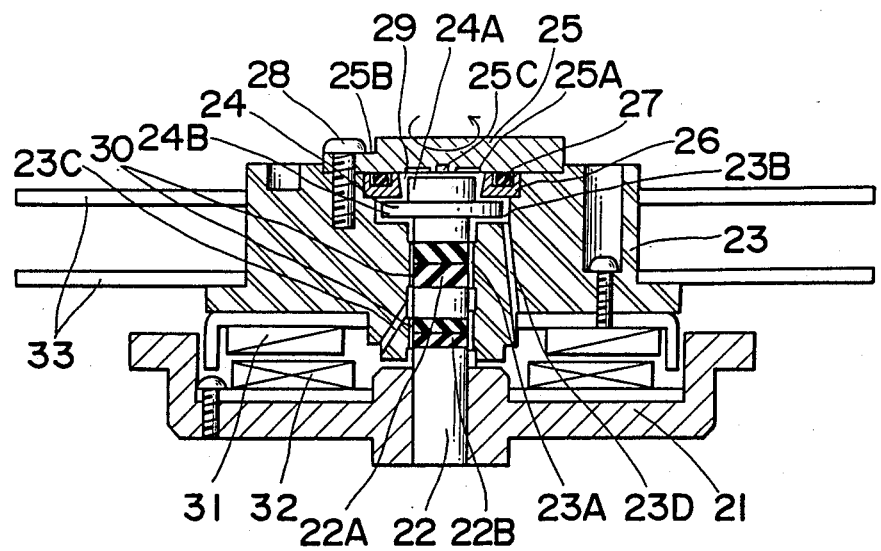
FIG. 1 is a side sectional view of a hydrodynamic bearing device according to one preferred embodiment of the present invention.

Before the description of the present invention proceeds, it is to be noted that like parts are designated by like reference numerals throughout the accompanying drawings.

Referring now to the drawings, there is shown in FIG. 1 a hydrodynamic bearing device according to one preferred embodiment of the present invention as applied to a hard disc apparatus.

Figure 2:
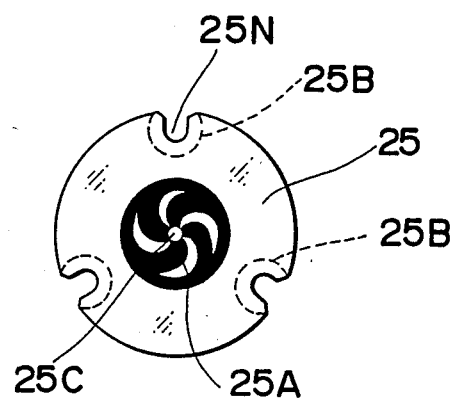
FIG. 2 is a top plan view of a thrust bearing member employed in the arrangement of FIG. 1.

As shown in FIG. 1, the hydrodynamic apparatus generally includes a base member 21, a shaft 22 fixed at its one end to the base member 21 by shrinkage fit, etc. and formed with herringbone grooves 22A and 22B for effecting pressure generation for a radial bearing, and a hub 23 as a rotary member formed with a bearing bore 23A for receiving the shaft 22 to constitute the radial bearing and a space 23B and ventilating holes 23C and 23D. A stepped flange member 24 fixed at an upper end portion of the shaft 22 includes a cylindrical portion 24A having a diameter larger than that of the shaft 22 and a flange portion 24B. In the space 23B of the hub 23, a ring-shaped member 26 having a taper face corresponding to the cylindrical portion 24A is provided together with a seal ring 27. A thrust bearing member 25 having spiral grooves 25A and a plurality of notches 25N with stepped portions 25B at its peripheral edge (FIG. 2) is fixed to the hub 23 by screws 28, etc., with a recess hole 25C being formed at the central portion of the spiral grooves 25A for storing mixed foreign matters and the like. A thrust lubricating material 29 is poured into the spiral grooves 25A and the inner diameter portion of the ring-shaped member 26, while a radial lubricating material 30 is applied into the herringbone grooves 22A and 22B. A motor rotor 31 provided on the under face of the hub 23 is arranged to attract the motor stator 32 disposed on the base member 21 in the thrust direction by a force of about 1 to 2 kg.

For specific dimensions in the foregoing embodiment, the shaft 22 has a diameter of 5 mm, and the thrust bearing has a diameter (i.e. diameter at the cylindrical portion 24A) of 6 mm. For the thrust lubricating material, grease having viscosity of about 20 centipoise is employed, while for the radial lubricating oil, oil at approximately the same degree of viscosity is adopted.

Subsequently, functioning of the hydrodynamic bearing device having the construction as described so far will be described with particular reference to FIGS. 1 to 4.

Figure 4:
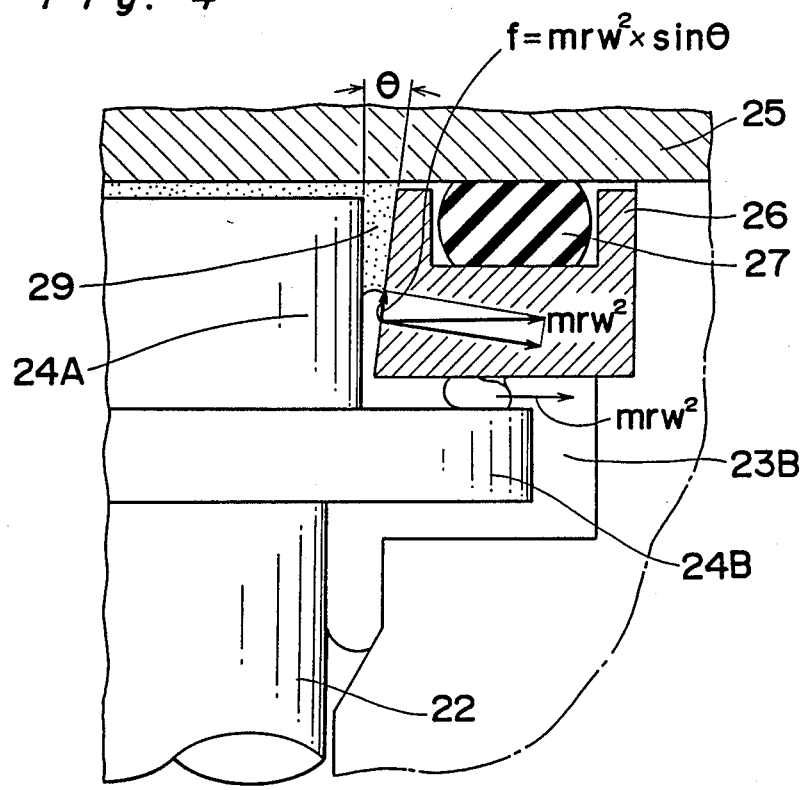
FIG. 4 is a diagram for explaining functions of the arrangement of FIG. 1.

In FIG. 1, upon energization of the motor stator 32, a rotating magnetic field is produced, whereby the motor rotor 31 starts rotation together with the hub 23, thrust bearing member 25, ring-shaped member 26, seal ring 27, screws 28 and disc 33, etc., and thus, the radial lubricating material 30 is raised in pressure by the pumping action of the herringbone grooves 22A and 22B for rotation of the above members without contact, while simultaneously, by the pumping action of the spiral grooves 25A, the thrust lubricating material 29 is raised in pressure, so that the thrust bearing member 25 overcomes the attracting force of the motor 31 and is raised by a predetermined amount (about 5 $\mu$m) from the upper end of the stepped flange member 24 for rotation without contact. As is seen in FIG. 4, each end face of the flange portion 24B of the stepped flange member 24 is located within the space 23B of the hub 23 so as to serve as a retainer for the rotary member such as the hub 23, etc. Meanwhile, the taper face in the inner periphery of the ring-shaped member 26 imparts a component force f equal to $mrw^2 \times \sin\theta$ of the centrifugal force ($mrw^2$), to the thrust lubricating material 29 contained between said taper face and the cylindrical portion 24A of the stepped flange member 24 so as to direct the lubricating material 29 towards the side of the thrust bearing member 25 by the component force for prevention of flowing out of said lubricating material 29. Furthermore, since there is no possibility that the helical groove strongly stir and scatter the thrust lubricating material 29 as in the conventional arrangement even at high speed rotation, the lubricating material may be stably maintained for long periods. The seal ring 27 prevents the thrust lubricating material 29 from flowing out through between the thrust bearing member 25 and the ring-shaped member 26.

Figure 3:
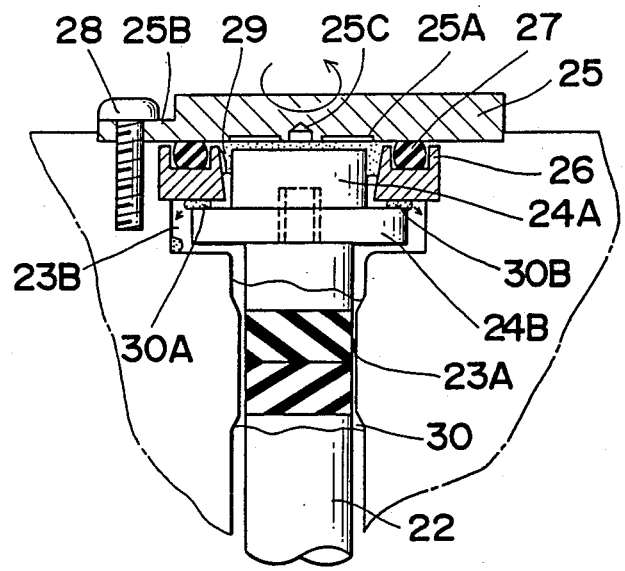
FIG. 3 is a fragmentary side sectional view showing on an enlarged scale, a thrust bearing portion in the arrangement of FIG. 1.

In FIG. 3, the clearance between the flange portion 24B and the ring-shaped member 26 is set to be less than approximately 0.2 mm, and in the case where an excess amount of the radial lubricating oil 30 poured in the vicinity of the herringbone grooves 22A is about to be mixed into the thrust lubricating material through said clearance, such mixing is prevented by applying the centrifugal force $mrw^2$ to the lubricating material for the rotating ring-shaped member 26 so as to scatter the lubricating material about to be mixed as shown at 30A and 30B. It should be noted here that the mixing can not be sufficiently prevented if the clearance is larger than approximately 0.5 mm.

Subsequently, the diameter of the bearing is a large factor for designing the floating or rising amount of the thrust bearing, and in order to obtain a sufficient rising amount when a lubricating material of low viscosity is employed as in the present invention, it is necessary to set the bearing diameter to be large. However, in the conventional arrangement, it has been difficult to set the diameter of the thrust bearing large, since the increase of the diameter results in an increase of the frictional torque for the radial bearing.

According to the foregoing embodiment of the present invention, it is possible to obtain a sufficient rising amount of the thrust bearing without an excessive increase of torque, by setting the diameter of the cylindrical portion 24A of the stepped flange member 24 to be larger than that of the shaft 22.

In FIG. 1, an electrically conductive material in a grease state prepared by mixing a thickening agent, and graphite or carbon or metallic fine particles of copper, aluminum or the like, into a synthetic lubricating oil is used, and a grounding effect is available between the thrust bearing member 25 and the ring-shaped member 26 through said conductive lubricating material for directing the static electricity generated during rotation of the hub 23 and disc 33 towards the stationary side, whereby the grounding brush conventionally required may be dispensed with, thus making it possible to construct the hydrodynamic bearing device very thin on the whole. In this case, owing to the presence of the ring-shaped member 26 having a taper, the conductive lubricating material at the thrust bearing portion is held in a sufficient amount to provide a stable grounding effect. In the case where the ring-shaped member 26 is made of an electrically conductive material, the grounding resistance becomes still smaller.

In FIG. 1, the thrust bearing member 25 has a thickness larger than 1.5 mm so as to avoid any curving or warping thereof even when fixed by screws 28, but owing to the fact that the thrust bearing member 25 is formed with the stepped portions 25B (FIG. 2) and the heads of the screws 28 are received in said stepped portions, the bearing device may be constructed to be still thinner and more compact in size.

As is seen from the foregoing description, according to the above embodiment of the present invention, a sufficient rising amount of the thrust bearing may be obtained without scattering of the thrust lubricating material, and moreover, since the grounding brush is not required, a thin hydrodynamic bearing device may be advantageously presented through simple construction.

It is to be noted here that the herringbone grooves 22A and 22B described as formed on the surface of the shaft 22 in FIG. 1 may be modified to be formed on the inner peripheral face of the bearing bore 23A of the hub 23 to provide the same effect as in the embodiment, and that the spiral grooves 25A described as formed on the thrust bearing member 25 may be modified to be formed on the upper end face of the stepped flange member 24 for the same effect.

Figure 5:
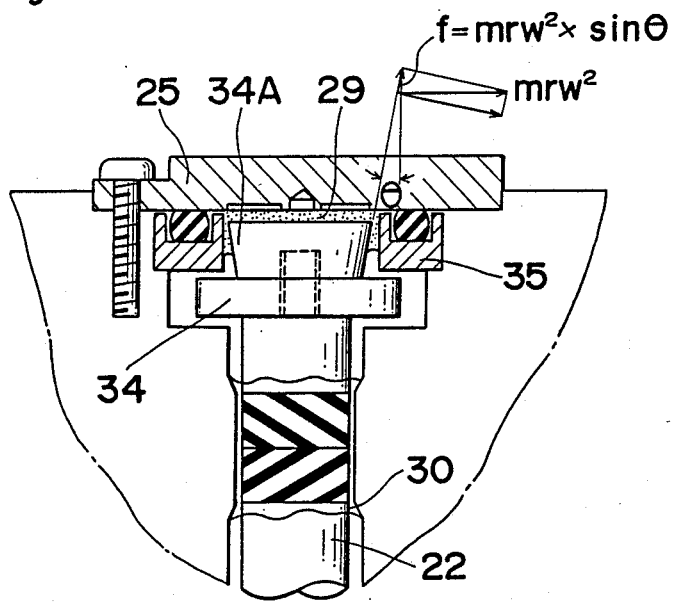
FIG. 5 is a view similar to FIG. 3, which particularly shows a modification thereof.
Figure 6:
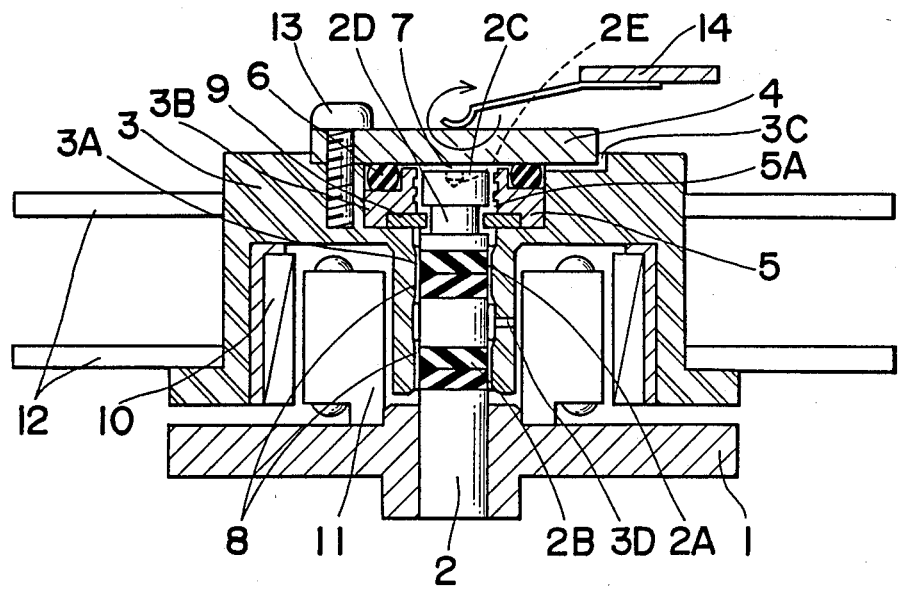
FIG. 6 is a side sectional view of a conventional hydrodynamic bearing device (already referred to)
Figure 7:
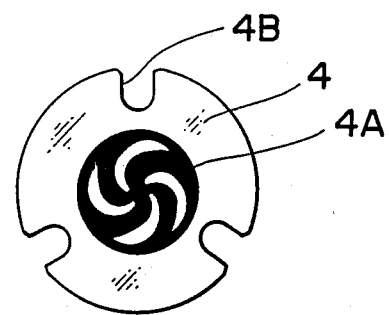
FIG. 7 is a top plan view of a thrust bearing member employed in the device of FIG. 6 (already referred to)
Figure 8:
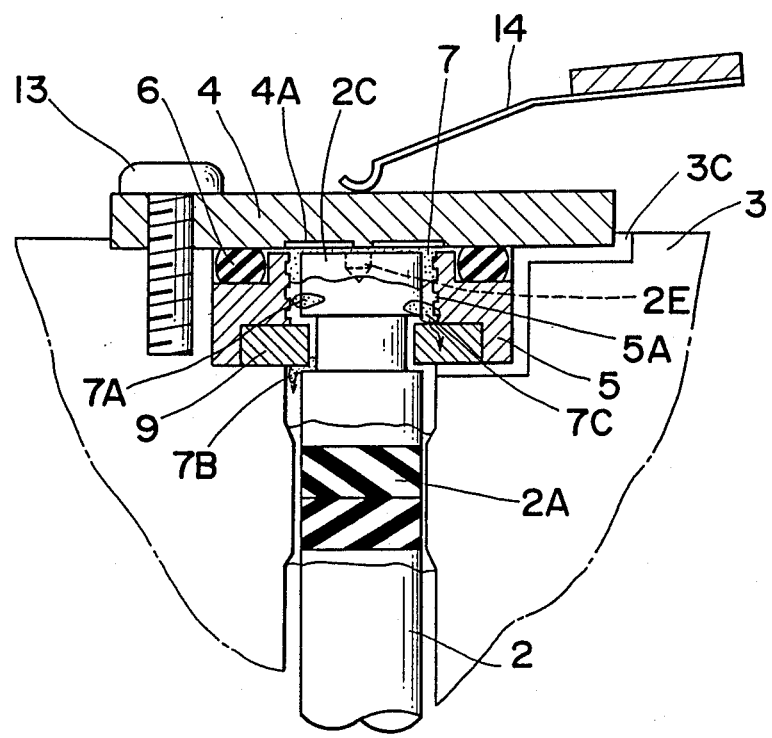
FIG. 8 is a fragmentary side sectional view showing on an enlarged scale, a thrust bearing portion in the device of FIG. 6 (already referred to).

Referring further to FIG. 5, there is shown a modification of the hydrodynamic bearing device in FIGS. 1 to 4. In the modified hydrodynamic bearing device of FIG. 9 5, the ring-shaped member 26 having the taper face on the inner peripheral face thereof is replaced by a ring-shaped member 35 without any taper face, while the stepped flange member 24 is also replaced by a stepped flange member 34 having a taper portion 34A on its upper portion as shown. Generally, in the bearing in which the shaft is rotated, the above arrangement can provide the centrifugal force more positively.

As is clear from the foregoing description, according to the hydrodynamic bearing device of the present invention, the lubricating material for the thrust bearing portion is stably retained even during high speed rotation owing to the centrifugal force effect by the taper portion provided on the ring-shaped member, thereby presenting the hydrodynamic bearing device without shortage of lubricating material.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A hydrodynamic bearing device which comprises a shaft, a ring-shaped member having an inner peripheral face confronting an outer peripheral face of said shaft in the vicinity of its forward end and a thrust bearing member disposed in a position confronting a forward end face of said shaft, with a lubricating material being held in a gap defined by an end face of said thrust bearing member, the inner peripheral face of said ring-shaped member and the outer face in the vicinity of the forward end of said shaft, either one or both of the inner peripheral face of said ring-shaped member and the outer peripheral face in the vicinity of the forward end of said shaft being formed with a conical face having a taper to increase its diameter in a direction as it approaches said thrust bearing member.

2. A hydrodynamic bearing device which comprises a shaft having a flange portion in the vicinity of its forward end, a thrust bearing member confronting a forward end face of said shaft, a ring-shaped member coaxial with said shaft and positioned between said flange portion and said thrust bearing member, and a rotary member integrally formed with said thrust bearing member and said ring-shaped member for rotation around said shaft, with a lubricating material being held in a gap in which the end face of said thrust bearing member, the inner peripheral face of said ring-shaped member and the outer face in the vicinity of the forward end of said shaft confront, either one or both of the inner peripheral face of said ring-shaped member and the outer peripheral face in the vicinity of the forward end of said shaft being formed with a conical face having a taper to increase its diameter in a direction as it approaches said thrust bearing member.

3. A hydrodynamic bearing device as claimed in claim 2, wherein a diameter of the end face of said flange portion provided on said shaft is larger than an outer diameter of said shaft.

4. A hydrodynamic bearing device as claimed in claim 2, wherein the lubricating material is of a grease material containing graphite, carbon or metallic fine particles.

5. A hydrodynamic bearing device as claimed in claim 2, further including a seal ring disposed between said thrust bearing member and said ring-shaped member.

6. A hydrodynamic bearing device which comprises a shaft having a stepped flange portion in the vicinity of its forward end, a thrust bearing member confronting a forward end face of said stepped flange portion, a ring-shaped member coaxial with said shaft and positioned between said stepped flange portion and said thrust bearing member, and a rotary member integrally formed with said thrust bearing member and said ring-shaped member for rotation around said shaft, with a lubricating material being held in a gap between the end face of said thrust bearing member and the end face of said stepped flange portion, either one or both of the inner peripheral face of said ring-shaped member and the outer peripheral face in the vicinity of the forward end of said shaft being formed with a conical face having a taper to increase its diameter in a direction as it approaches said thrust bearing member.

7. A hydrodynamic bearing device as claimed in claim 6, wherein a diameter of the end face of said stepped flange portion is larger than an outer diameter of said shaft.

8. A hydrodynamic bearing device as claimed in claim 6, wherein the lubricating material is of a grease material containing graphite, carbon or metallic fine particles.

9. A hydrodynamic bearing device as claimed in claim 6, further including a seal ring disposed between said thrust bearing member and said ring-shaped member.

* * * * *